United States Patent
Duffour

(10) Patent No.: US 9,695,627 B2
(45) Date of Patent: Jul. 4, 2017

(54) GLAZING UNIT EQUIPPED WITH PERIPHERAL SEALING MEANS AND ITS MANUFACTURING PROCESS

(71) Applicant: SAINT-GOBAIN GLASS FRANCE, Courbevoie (FR)

(72) Inventor: Adrien Duffour, Orleans (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 128 days.

(21) Appl. No.: 14/370,723

(22) PCT Filed: Jan. 4, 2013

(86) PCT No.: PCT/FR2013/050013
§ 371 (c)(1),
(2) Date: Jul. 3, 2014

(87) PCT Pub. No.: WO2013/102737
PCT Pub. Date: Jul. 11, 2013

(65) Prior Publication Data
US 2014/0363601 A1    Dec. 11, 2014

(30) Foreign Application Priority Data
Jan. 6, 2012  (FR) ...................... 12 50165

(51) Int. Cl.
*E06B 3/58* (2006.01)
*B60J 1/00* (2006.01)
(Continued)

(52) U.S. Cl.
CPC ............. *E06B 3/5878* (2013.01); *B60J 1/007* (2013.01); *B60J 10/70* (2016.02); *E06B 3/54* (2013.01)

(58) Field of Classification Search
CPC ........ B32B 17/10293; B32B 17/10302; B32B 17/10; B32B 17/00; E06B 3/5878;
(Continued)

(56) References Cited

U.S. PATENT DOCUMENTS 3,455,080 A * 7/1969 Meadows ............... E06B 3/549
                                                  52/204.597
3,509,015 A * 4/1970 Ammons .......... B32B 17/10917
                                                  428/426
(Continued)

FOREIGN PATENT DOCUMENTS

GB      2 168 741        6/1986
JP      08109773 A  *    4/1996

OTHER PUBLICATIONS

Machine translation of JP 08-109773 A. Translated Feb. 2, 2017.*
International Search Report issued for International Application No. PCT/FR2013/050013, dated Aug. 6, 2013.

*Primary Examiner* — Maria Veronica Ewald
*Assistant Examiner* — Ethan A Utt
(74) *Attorney, Agent, or Firm* — Pillsbury Winthrop Shaw Pittman LLP

(57) ABSTRACT

A glazing unit includes a substrate having two opposing external faces and a peripheral edge face linking the two faces, as well as a peripheral sealing arrangement added at the border of the substrate against its edge face and its two external faces, wherein the sealing arrangement includes at least two seals cooperating respectively with the two external faces of the substrate, and with the edge face of the substrate, the two seals forming a zone of overlap over one another on the edge face of the glazing unit.

20 Claims, 3 Drawing Sheets

(51) Int. Cl.
*B60J 10/02* (2006.01)
*E06B 3/54* (2006.01)
*B60J 10/70* (2016.01)

(58) Field of Classification Search
CPC .......... E06B 3/58; E06B 3/585; E06B 3/5857;
E06B 3/5864; E06B 3/549; E06B 3/54;
E06B 3/62; E06B 2003/62; B60J 10/02;
Y10T 428/24198
USPC .................................................. 428/38, 122
See application file for complete search history.

(56) References Cited

U.S. PATENT DOCUMENTS

| | | | | |
|---|---|---|---|---|
| 4,321,777 | A * | 3/1982 | Sauret | B32B 17/10302 52/204.595 |
| 4,775,570 | A * | 10/1988 | Ohlenforst | B32B 17/10302 52/204.591 |
| 5,379,518 | A * | 1/1995 | Hopper | E06B 3/549 52/204.54 |
| 5,570,548 | A * | 11/1996 | Hopper | E06B 3/549 52/204.5 |
| 5,585,188 | A * | 12/1996 | Cheron | B32B 17/10302 52/309.1 |
| 5,637,363 | A * | 6/1997 | Leray | B32B 17/10302 428/192 |
| 8,621,793 | B2 * | 1/2014 | Abdul Lathief | E06B 3/549 52/204.53 |
| 2006/0026903 | A1* | 2/2006 | Nozaki | B60J 10/04 49/441 |
| 2006/0185273 | A1* | 8/2006 | Lathief | E06B 3/5821 52/204.71 |
| 2009/0113826 | A1* | 5/2009 | Abdul Lathief | E06B 3/549 52/214 |
| 2010/0000604 | A1* | 1/2010 | Moineau | E06B 3/5454 136/259 |
| 2010/0000605 | A1* | 1/2010 | Comert | E06B 3/5454 136/259 |
| 2011/0146793 | A1* | 6/2011 | Comert | E06B 3/5454 136/259 |
| 2013/0340308 | A1* | 12/2013 | Fette | G09F 7/18 40/606.01 |
| 2014/0115982 | A1* | 5/2014 | Abdul Lathief | E06B 3/549 52/204.71 |
| 2014/0230898 | A1* | 8/2014 | Moineau | E06B 3/5454 136/259 |

* cited by examiner

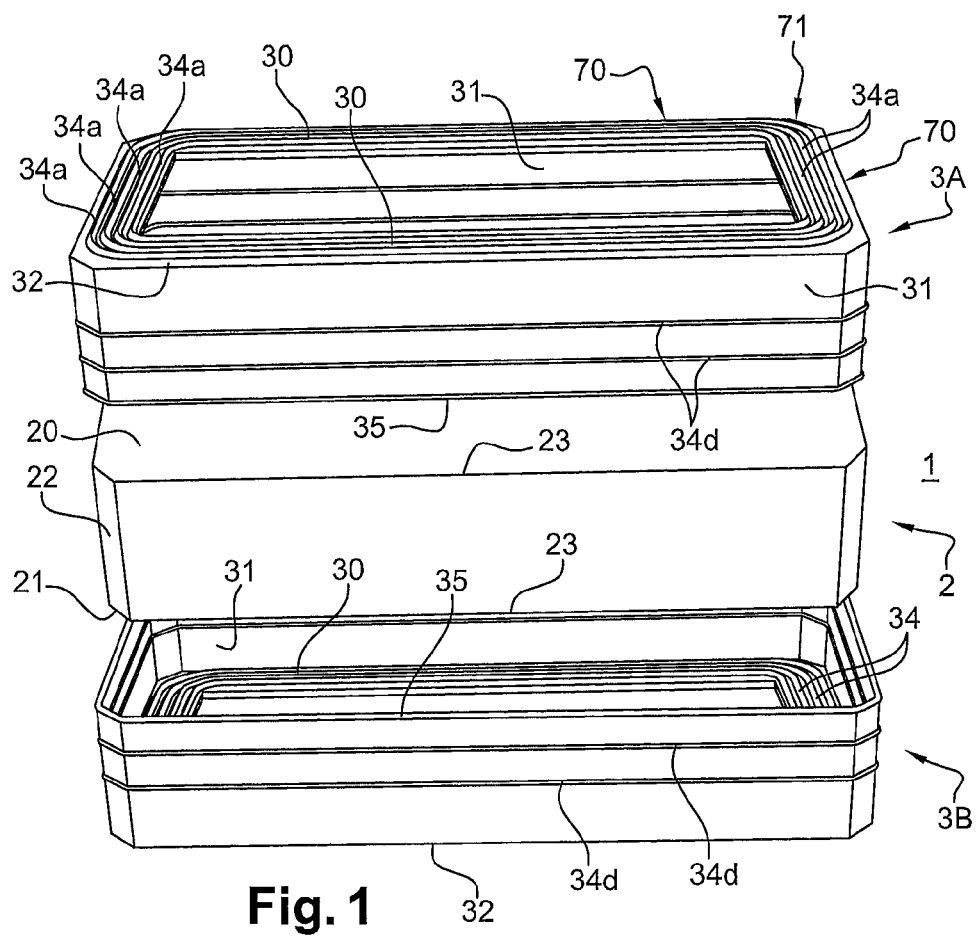
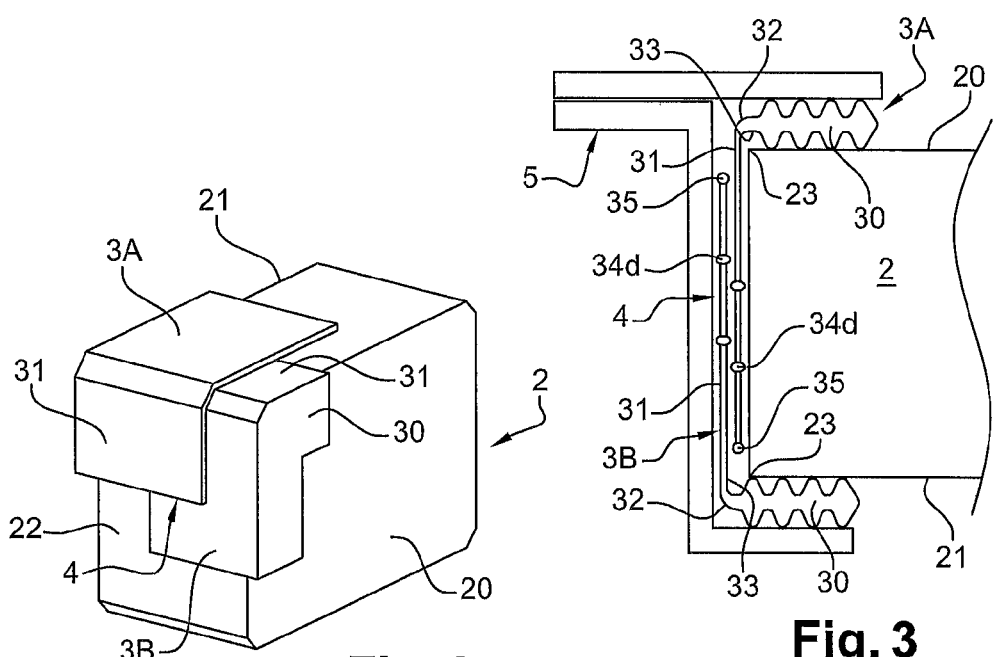
Fig. 1
Fig. 2
Fig. 3

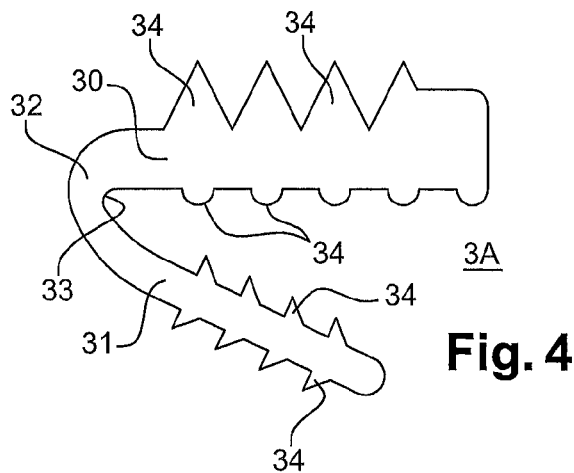
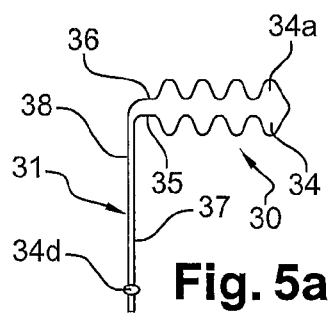
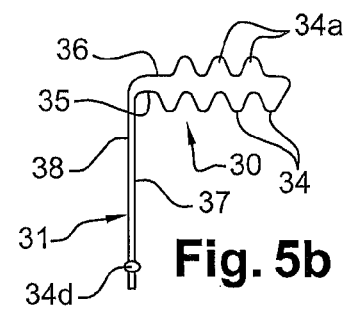
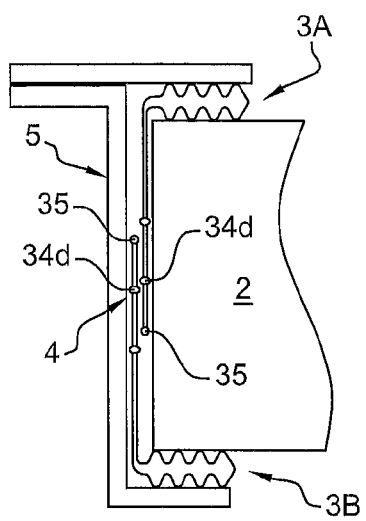
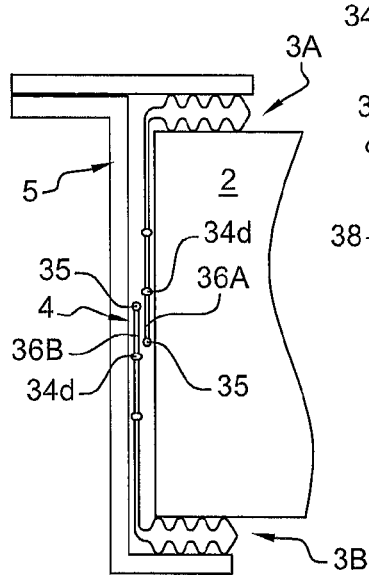
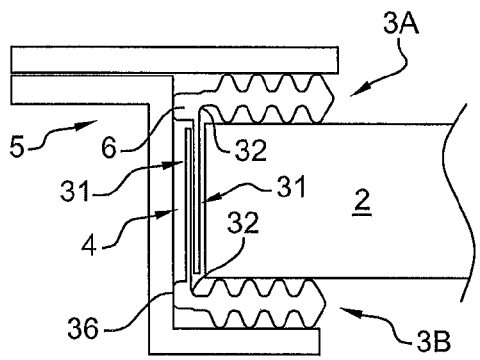

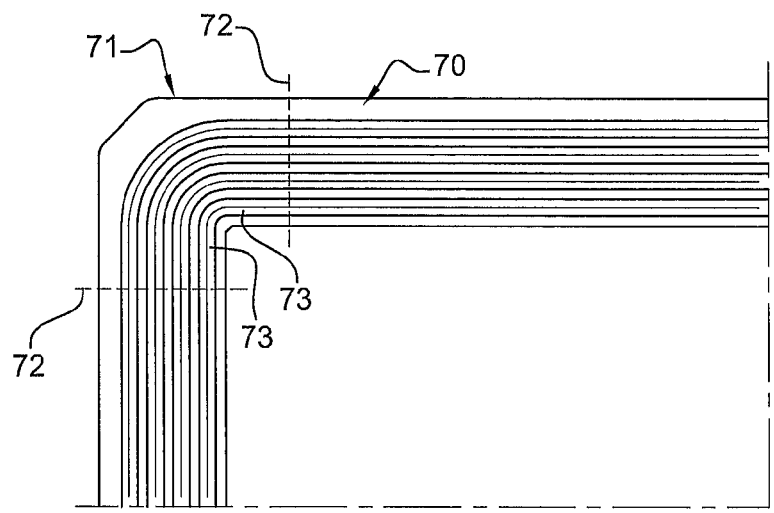
Fig. 7
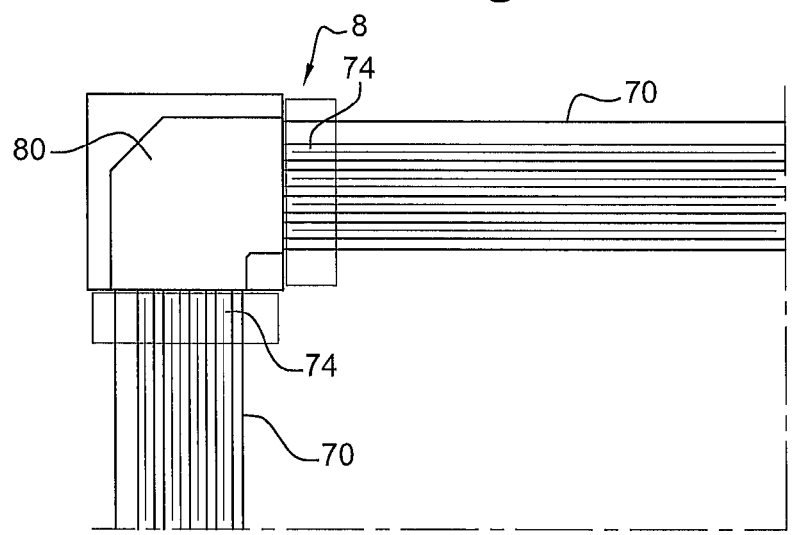
Fig. 8
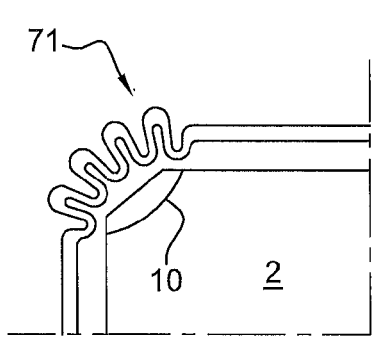   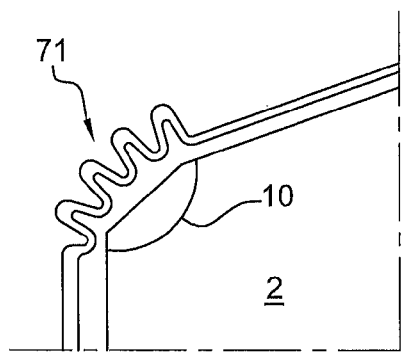
Fig. 9a                Fig. 9b

GLAZING UNIT EQUIPPED WITH PERIPHERAL SEALING MEANS AND ITS MANUFACTURING PROCESS

CROSS-REFERENCE TO RELATED APPLICATIONS

This application is the U.S. National Stage of PCT/FR2013/050013, filed Jan. 4, 2013 which in turn claims priority to French Application No. 1250165, filed Jan. 6, 2012. The content of both applications are incorporated herein by reference in their entirety.

The invention relates to a glazing unit provided with a peripheral seal, and its manufacturing method.

More particularly, the glazing unit of the invention has a significant thickness imposed by the application targeted for it, notably a thickness of between 30 and 200 mm.

The applications are notably, but without being limited thereto, glazing units for transport vehicles, shielded glazing units, glazing units for military vehicles, rail stock, etc.

This type of glazing unit is generally laminated, and comprises at least two substrates, even more, of various natures such as glass, crystal, ceramic, organic transparent material, and interposed sheets of polyvinylbutyral (PVB) or similar, as well as a peripheral seal preventing the ingress of any moisture into the laminated structure and avoiding any ingress of the moisture outside the vehicle accommodating the glazing unit into the interior of the vehicle.

Moreover, the glazing unit is intended to be arranged in a frame which constitutes the accommodating structure for the application targeted for the glazing unit. Consequently, another aim of the seal is to ensure a seal-tightness between the frame and the glazing unit.

Currently, the association of the peripheral seal with the glazing unit is obtained by arranging the glazing unit in a mold, and by injecting sealing plastic material between the walls of the mold and the glazing unit. The seal is continuous over all the perimeter of the glazing unit and extends over the thickness (the edge face) of the glazing unit, its edges and the immediate peripheral zones of the edges, on the external faces of the glazing unit.

This manufacturing method requires the design of a specific mold for each glazing unit size, of the surface area and in thickness.

Obviously, such glazing units are manufactured in series, one and the same mold being used many times.

However, when the dimensions of the glazing units are changed, new molds have to be designed.

Now, the number of molds to be provided for a series of glazing units and the design of new molds when necessary represent considerable manufacturing costs whose reduction is desirable.

Furthermore, the seal associated with the substrate by this manufacturing method is consequently glued, which is not without problems when it has to be replaced during the life of the glazing unit because the sealing material is often damaged over time. Thus, the securing by gluing complicates the separation operations.

Therefore, the aim of the invention is to propose a glazing unit for which the sealing means are associated in a simple manner by being adapted easily to any thickness of the glazing unit, and being easy to separate, while not affecting the desired sealing qualities.

The invention also targets a simplified manufacturing method, particularly one that does not require a specific mold according to the thickness and the dimensions of the glazing unit, and that provides a rapid association/separation of the sealing means.

According to the invention, the glazing unit comprises a substrate having two opposing external faces and a peripheral edge face linking the two faces, as well as peripheral sealing means added at the border of the substrate against its edge face and its two external faces, and is characterized in that the sealing means comprise at least two seals cooperating respectively with the two external faces of the substrate, and with the edge face of the substrate, the two seals forming a zone of overlap over one another on the edge face of the glazing unit.

Within the meaning of the invention, "substrate" should be understood to mean a substrate that can comprise a plurality of sheets of glass or other transparent material such as from those listed previously with respect to the prior art, for example, assembled together, and interposed sheets of a material other than glass, such as the thermoplastic material of polyvinylbutyral (PVB) or similar type.

The qualifier "external" should be understood hereinbelow in the description to mean, respectively, facing the environment external to the element to which it is added.

The qualifier "internal" relates to a part facing the interior of the element to which it is added.

The use of two separate seals mounted in such a way as to sandwich the substrate renders the thickness of the glazing unit immaterial.

Consequently, whatever the thickness of the glazing unit, even in the case of a change of thickness for an application, and within acceptable thickness range corresponding to the maximum spread of the two seals to ensure the zone of overlap, the invention makes it possible to limit the costs and the lead times of this modification without demanding additional toolage or adapting the existing toolage.

It should be recalled that it is not uncommon in an application for the thickness of the glazing unit to be modified. There are various reasons for this, such as a new design of the glazing unit, an increase in its mechanical strength properties, an added function, etc.

Moreover, this design of the sealing means in two identical parts with sequential fitting (the first seal is fitted and then the second is added) ultimately results in a reduction, compared to the prior art, in the time it takes to associate the sealing means, and in the replacement time which simplifies maintenance.

Thus, the first seal is pressed against one of the faces of the glazing unit and by a return against the edge face of said glazing unit, whereas the second seal is arranged opposite the first seal by being pressed against the opposite second face of the glazing unit and by a return which is pressed, on the one hand, onto said edge face of the glazing unit, and, on the other hand, by its extreme distal zone, against the return of the first seal so as to form said zone of overlap.

According to one feature, the seals are removable, notably mounted on the substrate by being clipped thereto.

Advantageously, the seals are unitary parts, each having a continuous perimeter corresponding to the perimeter of the substrate.

This design of the seal makes it possible to manufacture the seals independently of their association with the substrate, unlike in the prior art.

Each seal has a profile provided with a first linear wing, a second linear wing and a curved part linking the two wings, the two wings forming between them, in the rest state of the seal, an acute angle. "Rest state" is to be understood to mean a position of the seal in which it is not or not yet fully mounted on the substrate.

Each seal in the state mounted on the substrate is secured thereto by an elastic association, and has a first linear wing pressed against one of the external faces of the glazing unit and a second linear wing tight against the edge face of the glazing unit.

According to another feature, the portions of seals, facing the edge face of the substrate, overlap by a length which varies between a given threshold value and the overall dimension of the thickness of the substrate. The threshold value is in particular 10 mm.

Advantageously, each seal has, on its portion cooperating with that of the other seal, continuous overthicknesses or ribs. These ribs ensure the seal-tightness between the seals in the zone of overlap. The ribs can also contribute to the grip and to the rigidification of the part of seal situated on the edge face of the substrate. The ribs can also channel the glue described above.

Preferably, the seals are glued together in the zone of overlap. The gluing is done with a continuous string of glue or with spots spaced apart.

According to yet another feature, the seals have lips which are pressed against the external faces of the substrate, and preferably other lips arranged in an opposite plane and which are intended to cooperate with the internal surface of a structure accommodating the glazing unit, of frame type.

Generally, each seal has a maximum thickness, the distance from the summit of a lip to the summit of the opposite lip, of the order of 5 mm.

According to another feature, each seal is made of a flexible material and suitable for extrusion and molding, such as a polymer plastic material or of rubber type. Non-limiting examples of materials are silicone or ethylene propylene diene monomer (EPDM).

Preferably, the material has a hardness of between 50 and 65 Shore A.

The elasticity of the material thus makes it possible to deploy the housing space arranged between the wings of the seal and makes it easy to fit said seal after the border of the substrate, for the latter then to be tightened and compressed against the substrate, ensuring that it is held firmly.

The hardness of the seal and the tension applied by the latter to the substrate may differ over the perimeter of the substrate, in particular by segment or side of the substrate, in order to be adapted notably to the size of said substrate. Thus, to avoid the "yawning" phenomenon in the median part of a side with the seal held torque at and in proximity to the corners, its hardness will be appropriate to ensure appropriate tension over the entire side, including in its median part, in order to ensure that it is held firmly. Consequently, extruded linear parts of different hardness may be associated, providing suitable distinct tensions.

The method for manufacturing the glazing unit of the invention involves having the seals manufactured separately then added against the substrate.

The manufacture of a seal comprises a step of extrusion of linear parts and at least one step consisting in manufacturing corner parts and in securing them to the linear parts by molding, notably by injection molding. Preferably, a number of molds will be used to form, in a single stage, the corners of the glazing unit and provide all of the continuous seal.

The invention therefore makes it possible to adapt to any glazing unit geometry and thickness.

The present invention is now described with the aid of purely illustrative examples that are in no way limiting on the scope of the invention, and on the basis of the attached illustrations, in which:

FIG. 1 represents an exploded perspective view of a glazing unit of the invention;

FIG. 2 is a detailed perspective schematic partial view of the glazing unit;

FIG. 3 is a partial cross-sectional view from the side of the glazing unit incorporated in an accommodating frame;

FIG. 4 is a cross-sectional view from the side of an exemplary embodiment of the seal according to the invention in the rest state, without being mounted on the glazing unit;

FIGS. 5a to 5c illustrate cross-sectional views of three respective seal profile variants;

FIGS. 6a to 6c illustrate variants of FIG. 3 according to other glazing unit thicknesses;

FIG. 7 is a partial plan view of the seal once manufactured;

FIG. 8 is a plan view of the seal in a manufacturing step;

FIGS. 9a and 9b are partial schematic plan views of two glazing unit variants with the same seal.

The glazing unit 1 of the invention, illustrated in the exploded view of FIG. 1, comprises a substrate 2 and at least two peripheral sealing means 3A and 3B.

The glazing unit is intended for applications requiring thick and/or complex substrates incorporating a number of sheets of glass or other transparent material such as those listed previously with respect to the prior art, for example, interposed sheets of plastic material. The uses are, for example, for shielded glazing units, glazing units for military vehicles and rail stock, aeronautical glazing units.

The thickness of the glazing units of the invention is notably between 30 and 200 mm.

The substrate 2 has two general opposing external faces 20 and 21, and a peripheral edge face 22 linking the two faces.

According to the invention, as illustrated in FIG. 2, the sealing means 3A and 3B are associated at the border of the glazing unit, respectively against each of the opposing external faces 20 and 21 of the substrate and against the edge face 22.

Each of the sealing means 3A, respectively 3B, (FIG. 1) extends over all of the periphery of the substrate, and, on the one hand, partially covers one of the external faces 20, respectively 21, of the substrate, and, on the other hand, extends over all or part of the edge face 22, the portions or wings of the sealing means arranged facing the edge face 22 being superposed by a zone of overlap 4 (FIG. 2).

Each sealing means 3A, 3B forms a continuous seal all around the perimeter of the glazing unit. The guarantee of seal-tightness on the edge face 22 of the glazing unit is assured by the overlap of the sealing means. The manufacture of the seal will be described later.

As can be seen in FIGS. 1 to 3, and more particularly in light of FIG. 3, the continuous seal has a first wing 30 pressed against an external face 20 or 21 of the substrate 2 and a second wing 31 pressed against the edge face 22 of the substrate, wings forming, at the edge 23 connecting the general face of the substrate to the edge face, a curved link 32 covering said edge.

In the mounted position of the seal, the wings 30 and 31 form between them an angle 33 corresponding to the angle that each face of the substrate forms with its edge face, generally, and here, a right angle.

The seal is formed from an elastic sealing material so as to be able to be stretched to fit the edge of the glazing unit and be relaxed to closely follow the profile of the edge of the glazing unit while being held by pressure on said edge without implementation and/or additional securing means.

The continuous seal constitutes a framing part as such, manufactured independently and added removably to the substrate.

In the free state, as illustrated in FIG. 4, that is to say when the seal 3A or 3B is in its relaxed state, the wings 30 and 31 form between them an angle 33 which is acute, which imposes on the seal a return force when it is in the stretched state and associated with the substrate, guaranteeing that is held firmly on the edge of the substrate.

The material of the seal meets the following properties, namely:
water-tightness,
suitable for extrusion and injection molding,
hard enough to control the extrusion,
supple and flexible enough to be deformed elastically.

Preferably, the material forms part of the family of rubbers or polymers, and exhibits a hardness of between 50 and 60 Shore A. It is for example made of silicone.

Each wing 30, 31 can have a distinct profile.

In practice, the substrate provided with the seal is intended to be incorporated in a frame 5 (FIG. 3) which constitutes the structure accommodating the glazing unit linked to the use. In particular, the wing 30, which is pressed against the general face of the substrate and is tight against said frame, has a profile adapted to the use envisaged for the glazing unit, so as to provide a trade-off between the seal-tightness required and the mechanical securing of the substrate in the frame.

FIG. 4 shows that the wings 30 and 31 have lips 34 with different shapes.

FIGS. 5a to 5c illustrate a number of profile variants for the wing 30 according to the applications targeted. The wing 30 for each of the three variants comprises lips with a shape and arrangement that vary from one variant to another.

With regard to FIG. 5a, lips 34 and 34a of the wing 30 are arranged respectively on the opposing faces 35 and 36 of the seal intended to be pressed against the substrate and respectively the frame. These lips, as can also be seen in FIG. 1, form bosses whose summits are in planes parallel to the faces 35 and 36 and are perfectly symmetrical from one plane to the other. Although this profile is less able to take up the flatness defects of the substrate, it does guarantee an excellent securing of the glazing unit in its frame. Such a profile is in particular used for shielded glazing units.

In FIG. 5b, the lips 34 and 34a have the same bumpy profile as illustrated in FIG. 5a. However, the summits on either side of the faces 35 and 36 of the seal are staggered, a summit on one of the sides having a dip on the other side. This profile creates a good securing of the glazing unit in its frame and adequately takes up the flatness defects.

With regard to FIG. 5c, the lips 34b and 34c form branches spaced apart on either side of the faces 35 and 36, these branches being substantially curved by an inclination from the second wing 31. This profile prioritizes the taking up of the flatness defects of the substrate over the mechanical securing of the glazing unit in its frame.

The second wing 31, intended to be pressed against the edge face 22 of the glazing unit, has a simpler profile, with no pronounced protruding lip. It has (FIGS. 1, 3 and 5a to 5c), on each of its opposing faces 37 and 38, a planar surface with, preferably, longitudinal ribs 34d that are continuous and spaced apart. A rib 35 is provided at the distal end of the wing 31.

With regard to FIGS. 3 and 6a and 6b, the overlap of the seals 3A and 3B is produced in such a way that the ribs 34d of the seal 3A are not facing the ribs 34d of the other seal 3B. The ribs 34d and 35 provide the seal-tightness of one seal relative to the other.

These ribs serve another purpose when optional gluing is planned in the zone of overlap 4 of the seals 3A and 3B. They delimit channels in which the glue is spread.

Finally, in an additional seal variant illustrated in FIG. 6c, indexing means 6 for the positioning in the frame 5 of the substrate 2 provided with its seals 3A and 3B are advantageously associated with the seals. These indexing means consist of a local overthickness of the seals, positioned on the outer face of the seals and at the join 32 between the two wings of one and the same seal.

According to the invention, the zone of overlap 4 of the seals guarantees a perfect seal-tightness. The length of the wing 31, where the overlap is made, is sufficient to ensure an overlap regardless of the substrate thickness (FIGS. 6a to 6c).

The overlap for great thicknesses (FIG. 6b) is minimized as far as the distal end zone 36A of the seal 3A, in proximity to the end rib 35, i.e. facing the distal end zone 36B of the seal 3B, in proximity to the corresponding end rib 35.

When the thickness of the glazing unit is less than the length of the second wing 31 of a seal, the wing 31 of each seal 3A, 3B is then cut (FIG. 6c) over the perimeter of the seal to reduce its dimension at most to that of the thickness of the substrate, while retaining a length allowing the overlap 4.

The method for manufacturing the glazing unit is now described.

The benefit of the method of the invention is to be able to manufacture the sealing means independently of their association with the substrate.

Once the perimeter of the substrates is known, the sealing means can be manufactured by mass production and delivered subsequently to be mounted on the substrates.

The mounting of the sealing means is performed:
by fitting the first seal 3A onto the substrate by one of its sides, the wing 30 on one side of the seal being pressed against the external face of the substrate while the second wing 31 is pulled to bring it against the edge face 22 of the substrate, which "encapsulates" the edge 23 of the substrate along a first side;
by pulling on said second wing 31 of the seal bit by bit over the entire perimeter of the seal and by pressing it against the edge face of the substrate, the edge of the glazing unit is ultimately totally covered, with the first seal fitted to it;
the same method is applied for the second seal 3B, the wing 31 of the second seal then partially overlapping the wing 31 of the first seal to form the zone of overlap 4.

When there is a desire, for certain applications, to glue the two seals in the zone of overlap, then, prior to the fitting of the second seal, glue is placed in the external channels of the wing 31 of the first seal delimited by the ribs 34d and 35.

The method for manufacturing a seal is as follows.

First of all, it will be noted with respect to FIGS. 1 and 7 that the continuous seal of the invention is made from linear parts 70 and corner parts 71. The linear parts are secured to the corner parts along virtual weld lines 72 schematically represented by broken lines in FIG. 7. Ultimately, the seal is of a single piece.

The linear parts 70 are extruded. The sealing material is extruded according to the desired seal profile in great lengths (several meters), then the extruded product is cut to provide linear parts whose lengths correspond substantially to the sides of the substrate. Said lengths are shorter than the sides of the substrate to take account of the corner parts 71 which form returns 73 that are abutted and secured to the linear parts 70.

With regard to FIG. 8 which schematically illustrates by a plan view the operation of securing a corner part 71 and two linear parts 70, the free ends 74 of the linear parts are placed inside a mold 8 which presents the cavity 80 of the corner part, then the sealing material is injected into the mold. After it is stripped from the mold, the corner part is secured to the linear parts.

Moreover, the shape of the corner seal can easily be changed if necessary to be adapted to the corner geometry of the substrates. For this, only a corner mold needs to be designed without having to modify the manufacture of the linear parts.

For example, with regard to FIGS. 9a and 9b, corner parts can be produced with an accordion profile which makes it possible to control the deformation of the material when it is associated with the substrate in order to allow, with the same seal, a mounting on distinct substrates in which the angle 10 between two sides is different.

The invention claimed is:

1. A glazing unit comprising a substrate having two opposing external faces and a peripheral edge face linking the two external faces, and a peripheral sealing arrangement added at a border of the substrate against the peripheral edge face and the two external faces, wherein the sealing arrangement comprises at least two seals, each one of the two seals cooperating with the peripheral edge face of the substrate and with one of the two external faces of the substrate so that said one of the two seals extends over said one of two external faces without extending over the other one of the two external faces, the two seals forming a zone of overlap over one another on the peripheral edge face of the substrate, said zone of overlap having a length along a direction of a thickness of the substrate that is equal to or less than the thickness of the substrate, wherein each seal has a profile provided with a first linear wing, a second linear wing and a curved part linking the first and second linear wings, each seal being elastically deformable and being in a deformed state on said substrate so that an angle between the first and the second wing of the seal in said deformed state is greater that an acute angle that exists between the first and the second wing of the seal in a nondeformed state.

2. The glazing unit as claimed in claim 1, wherein the length of the zone of overlap is less than the thickness of the substrate.

3. A glazing unit comprising a substrate having two opposing external faces and a peripheral edge face linking the two external faces, and a peripheral sealing arrangement added at a border of the substrate against the peripheral edge face and the two external faces, wherein the sealing arrangement comprises at least two seals, each one of the two seals cooperating with only a different one of the two external faces, and with the peripheral edge face of the substrate, the two seals forming a zone of overlap over one another on the peripheral edge face of the substrate, said zone of overlap having a length along a direction of a thickness of the substrate that is equal to or less than the thickness of the substrate, wherein each seal has a profile provided with a first linear wing, a second linear wing and a curved part linking the first and second linear wings, each seal being elastically deformable and being in a deformed state on said substrate so that an angle between the first and the second wing of the seal in said deformed state is greater that an acute angle that exists between the first and the second wing of the seal in a nondeformed state.

4. The glazing unit as claimed in claim 3, wherein the seals are removable.

5. The glazing unit as claimed in claim 4, wherein the seals are mounted on the substrate by being clipped thereto.

6. The glazing unit as claimed in claim 3, wherein the seals are unitary parts, each having a continuous perimeter corresponding to the perimeter of the substrate.

7. The glazing unit as claimed in claim 3, wherein each seal in the state mounted on the substrate is secured thereto by its elastic association, and has a first linear wing pressed against one of the external faces of the glazing unit and a second linear wing tight against the peripheral edge face of the substrate.

8. The glazing unit as claimed in claim 3, wherein the portions of the seals facing the edge face of the substrate overlap by at least 10 mm.

9. The glazing unit as claimed in claim 3, wherein each seal has, on its portion cooperating with that of the other seal, continuous overthicknesses or ribs.

10. The glazing unit as claimed in claim 3, wherein the seals are glued together in the zone of overlap.

11. The glazing unit as claimed in claim 3, wherein the seals have lips which are pressed against the external faces of the substrate.

12. The glazing unit as claimed in claim 11, wherein the glazing unit is incorporable into a frame and wherein the seals include other lips arranged in an opposite plane and which are co-operable with an internal surface of the frame.

13. The glazing unit as claimed in claim 3, wherein the seals are made of a flexible material and able to be extruded and injection molded.

14. The glazing unit as claimed in claim 13, wherein the seals are made of ethylene propylene diene monomer (EPDM) or silicone.

15. A method for manufacturing a glazing unit as claimed in claim 3, comprising separately manufacturing the seals and adding the seals against the substrate.

16. The method for manufacturing a glazing unit as claimed in claim 15, wherein manufacturing a seal comprises extruding linear parts and manufacturing corner parts and securing the corner parts to the linear parts by molding.

17. The method for manufacturing a glazing unit as claimed in claim 16, wherein the corner parts are secured to the linear parts by injection molding.

18. The glazing unit as claimed in claim 3, wherein the substrate includes a plurality of glass sheets.

19. The glazing unit as claimed in claim 3, wherein each of the two seals is elastically deformable and is in a deformed state on said substrate so that each of the two seals presses against the peripheral edge face of the substrate.

20. The glazing unit as claimed in claim 3, wherein the length of the zone of overlap is less than the thickness of the substrate.

* * * * *